United States Patent
Lim et al.

(10) Patent No.: US 9,635,122 B2
(45) Date of Patent: Apr. 25, 2017

(54) WIRELESS COMMUNICATION SYSTEM AND METHOD FOR TRANSMITTING CONTENT IN WIRELESS COMMUNICATION SYSTEM

(75) Inventors: Chae Gwon Lim, Seoul (KR); Jung Je Son, Gyeonggi-do (KR); Jung Shin Park, Seoul (KR); Beom Sik Bae, Gyeonggi-do (KR); Sang Soo Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 14/006,936

(22) PCT Filed: Mar. 6, 2012

(86) PCT No.: PCT/KR2012/001623
§ 371 (c)(1),
(2), (4) Date: Sep. 23, 2013

(87) PCT Pub. No.: WO2012/128487
PCT Pub. Date: Sep. 27, 2012

(65) Prior Publication Data
US 2014/0019578 A1    Jan. 16, 2014

(30) Foreign Application Priority Data
Mar. 23, 2011    (KR) .......................... 10-2011-0026001

(51) Int. Cl.
*G06F 15/16* (2006.01)
*H04L 29/08* (2006.01)
(Continued)

(52) U.S. Cl.
CPC ...... *H04L 67/2842* (2013.01); *H04L 61/1511* (2013.01); *H04L 65/1069* (2013.01);
(Continued)

(58) Field of Classification Search
CPC .................................................. H04L 67/1021
(Continued)

(56) References Cited

U.S. PATENT DOCUMENTS

| 7,228,359 B1 | 6/2007 | Monteiro |
| 2008/0229020 A1 | 9/2008 | Plamondon |

(Continued)

FOREIGN PATENT DOCUMENTS

| KR | 10-2005-0054080 | 6/2005 |
| KR | 10-2005-0098199 | 10/2005 |

(Continued)

OTHER PUBLICATIONS

International Search Report dated Sep. 26, 2012 in connection with International Patent Application No. PCT/KR2012/001623, 3 pages.

(Continued)

*Primary Examiner* — Hamza Algibhah

(57) ABSTRACT

The present invention relates to a wireless communication system and a method for managing a cache server in the wireless communication system, the invention includes a step for checking a regional cache server to transmit contents when a DNS (Domain Name System) request a message for receiving contents acquired from a terminal, and a step for transmitting the contents by the cache server according to a contents request message received from the terminal. These steps can prevent the same data from being transmitted several times through a wireless communication network. Therefore, network usage associated with the service is reduced, and the network can be used more efficiently.

17 Claims, 12 Drawing Sheets

(51) Int. Cl.
*H04L 29/12* (2006.01)
*H04L 29/06* (2006.01)
*H04W 48/14* (2009.01)

(52) U.S. Cl.
CPC ...... *H04L 65/4084* (2013.01); *H04L 67/2847* (2013.01); *H04W 48/14* (2013.01)

(58) Field of Classification Search
USPC .......................................................... 709/213
See application file for complete search history.

(56) References Cited

U.S. PATENT DOCUMENTS

| 2010/0008290 | A1* | 1/2010 | Fischer | H04L 67/2842 370/328 |
| 2012/0113959 | A1* | 5/2012 | Sugizaki et al. | 370/331 |
| 2012/0178416 | A1* | 7/2012 | Miklos et al. | 455/410 |
| 2013/0229918 | A1* | 9/2013 | Ludwig et al. | 370/230 |
| 2013/0279414 | A1* | 10/2013 | Damola et al. | 370/328 |
| 2013/0336221 | A1* | 12/2013 | Damola et al. | 370/328 |

FOREIGN PATENT DOCUMENTS

KR  10-2005-0098200  10/2005
KR  10-2007-0060991  6/2007

OTHER PUBLICATIONS

Written Opinion of International Searching Authority dated Sep. 26, 2012 in connection with International Patent Application No. PCT/KR2012/001623, 4 pages.

Hu, et al.; "Design and Scalability of NLS, a Scalable Naming and Location Service"; IEEE INFOCOM; XP010593688; 2002; 10 pages.

Extended European Search Report dated Mar. 15, 2013 in connection with European Patent Application 12760556.6; 7 pages.

* cited by examiner

WIRELESS COMMUNICATION SYSTEM AND METHOD FOR TRANSMITTING CONTENT IN WIRELESS COMMUNICATION SYSTEM

CROSS-REFERENCE TO RELATED APPLICATION(S)

The present application claims priority under 35 U.S.C. §365 to International Patent Application No. PCT/KR2012/001623 filed Mar. 23, 2012, entitled "WIRELESS COMMUNICATION SYSTEM AND METHOD FOR TRANSMITTING CONTENT IN WIRELESS COMMUNICATION SYSTEM". International Patent Application No. PCT/KR2012/001623 claims priority under 35 U.S.C. §365 and/or 35 U.S.C. §119(a) to Korean Patent Application No. 10-2011-0026001 filed Mar. 23, 2011 and which is incorporated herein by reference into the present disclosure as if fully set forth herein.

TECHNICAL FIELD

The present disclosure relates to a method for managing a network efficiently through interoperation of a wireless communication and a data cache server. In more particular, the present disclosure relates to a method for facilitating service provision to the terminal by transmitting data to the cache server in advance in the system including a base station interoperating the cache server and a method and apparatus for establishing a tunnel for transmitting data between the cache server and the terminal.

BACKGROUND ART

Mobile communication systems developed to provide the subscribers with voice communication services on the move. With the rapid advance of technologies, the mobile communication systems have evolved to support high speed data communication services as well as the standard voice communication services. However, the limited resource and user requirements for higher speed services in the current mobile communication system spur the evolution to more advanced mobile communication systems. Long Term Evolution (LTE) is a next generation wireless communication technology standardized by the $3^{rd}$ Generation Partnership Project (3GPP) to meet the requirements. LTE is a high speed packet-based communication technology supporting up to 100 Mbps downlink data rate.

FIG. 1 is a diagram illustrating a legacy wireless communication system.

As shown in FIG. 1, the wireless communication system includes a User Equipment (UE) 100, a Macro enhanced Node B (macro eNB) 102, a Mobility Management Entity (MME) 104, a Serving Gateway (SGW) 106, and a Packet Data Network Gateway (PGW).

The macro eNB 102 is the base station managing a macro cell. Here, the macro cell means a cell of a normal cellular system. The macro eNB 102 is the base station of managing and controlling the macro cell. However, the terms 'macro cell' and 'macro eNB' are used in the same meaning for the convenience purpose. Accordingly, the eNB 102 managing the macro cell is referred to as macro eNB 102.

The macro eNB 102 establishes a radio channel with the User Equipment (UE) 100 and controls radio resources. For example, the macro eNB 102 may broad cast system information generated with the control information specific to the macro cell. The macro eNB 102 may allocate radio resource for communicating data and control information with the UE 100. The system information includes information on the operation supported by the eNB, i.e. Public Land Mobile Network Identifier (PLMN ID), eNB Cell Global ID (ECGI), and Tracking Area ID (TAI). The macro eNB 102 collects channel measurement result information of the serving and neighbor cells from the UE 100 and analyzes the information to make a handover decision and command handover. For this purse, the macro eNB 102 is provided with a control protocol such as Radio Resource Control Protocol for managing radio resources.

The MME 104 manages the UE in idle mode and selects PGW 108 and SGW 106. The MME 104 is also responsible for roaming and authentication of the UE 100. The MME 104 also process bearer signal generated by the UE 100. Typically, the MME 104 and UE 100 exchange Non Access Stratum (NAS) messages.

The MME 104 may support multiple TAIs and establish connection with the eNBs supporting the individual TAI. The eNBs 102 supporting the same TAI has the connection to the same MME 104, and the eNBs 102 supporting different TAIs are likely to have the connection to different MMEs.

The SGW 106 serves as a mobility anchor for UE's handover between macro eNBs or between 3GPP networks.

The PGW 108 allocates Internet Protocol (IP) address of the UE 100, performs core network's packet data-related function, and serves as a mobility anchor for handover between non-3GPP radio networks. The PGW 180 also determines a bearer band to be provided to the subscriber and is responsible for packet data forwarding and routing functions.

Typically, the eNB 102 and the MME 104 connect through an S1-MME interface, the eNB 102 and the SGW 106 connect through S1-U interface, and the SGW 106 and PGW 108 connect through S5 interface. The Home Subscriber Server (HSS) 114 stores per-UE subscription information. When the UE 102 tries to connect to a network, the HSS 114 provides the MME 104 with the information on the UE 102 such that the MME 104 controls the UE 102.

In the case of attaching to the macro eNB 102, the UE connects to the data network through the data transmission path 100 established via the macro eNB 102, SGW 106, and POW 108. In a typical wireless communication network, the UE 100 establishes the macro eNB 102 and sends the MME 104 a NAS request message. At this time, the NAS message may be any of Attach Request, Tracking Area Update Request, and Service Request. The UE 100 may communicate with a Dynamic Host Configuration Protocol (DHCP) server, a Domain Name Server (DNS) server, a web server, a File Transfer Protocol (FTP) server, a streaming server. The UE 100 request the server 112 for contents and the server 120 responds to the UE 100.

FIG. 2 is a signal flow diagram illustrating a procedure of acquiring contents in a conventional wireless communication system. Particularly, FIG. 2 shows the interoperation between the terminal and servers in which the terminal 200 connects to the contents server to acquire contents.

Referring to FIG. 2, the terminal 200 sends the DNS server a DNS request message including Uniform Resource Locator (URL) of the server having the intended content at operation 208. The DNS server 204 sends the terminal 200 a DNS response message including the IP address of the content server 206 at operation 210. Accordingly, the terminal 200 may send the content server 206 a message.

The terminal 200 sends a Content Request message, at operation 212, to the IP address of the content server 206 which is provided by the DNS server 204. Then the content server 206 sends the terminal 200 a Content Response message including the requested content at operation 214. Here, the messages exchanged between the terminal 200, the DNS server 204, and the content server 206 at operations 208, 210, 212, and 214 are relayed via eNB/SGW/PGW.

DISCLOSURE OF INVENTION

Technical Problem

In the wireless communication system operating as described above, if multiple users attempt to download the same content (e.g. program and video file) with their own terminals simultaneously, this causes a problem in that the same content is relayed through the PGW, SGW, and eNB several times. As such situation occurs repetitively; the radio resource of the wireless communication system is occupied for retransmission of the same data. This results in resource utilization inefficiency of the wireless communication.

Solution to Problem

The present disclosure proposes a method for providing the data rate of the network and providing the user with improved service in the wireless communication system. In more detail, the present disclosure proposes a method of reusing resource in such a way of, when the same content is necessary to be transmitted to plural terminals, transmitting the data to a location near the base station once other than several times. For this purpose, the present disclosure proposes a method of introducing a local cache server near the base station and managing it efficiently. In order to solve the above problem, a contents transmission method of a wireless communication system according to the present disclosure includes checking, when a Domain Name System (DNS) request message for receiving a content is received from a terminal, a local cache server for transmitting the content and transmitting, at the local cache server, the content in response to the content request message received from the terminal.

In order to solve the above problem, a contents transmission system of the present disclosure a terminal which transmits Domain Name System (DNS) request message for receiving a content and a local cache server which transmits the content to the terminal and is selected according to the DNS request message and located in a mobile communication operator network.

Advantageous Effects of Invention

According to the present disclosure, the user-intended data is stored in a local cache server near the base station so as to prevent the same data from be transmitted to the wireless communication network. Accordingly, it is possible to reduce the network utilization amount for service and use the network more efficiently. Also, the data is delivered to the terminal promptly so as to improve user's satisfaction to the service.

MODE FOR THE INVENTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Although the description is directed to the LTE system, it will be understood by those skilled in the art that the present invention can be applied even to other communication systems having the similar technical background and channel format, with a slight modification, without departing from the spirit and scope of the present invention.

Figure 1:
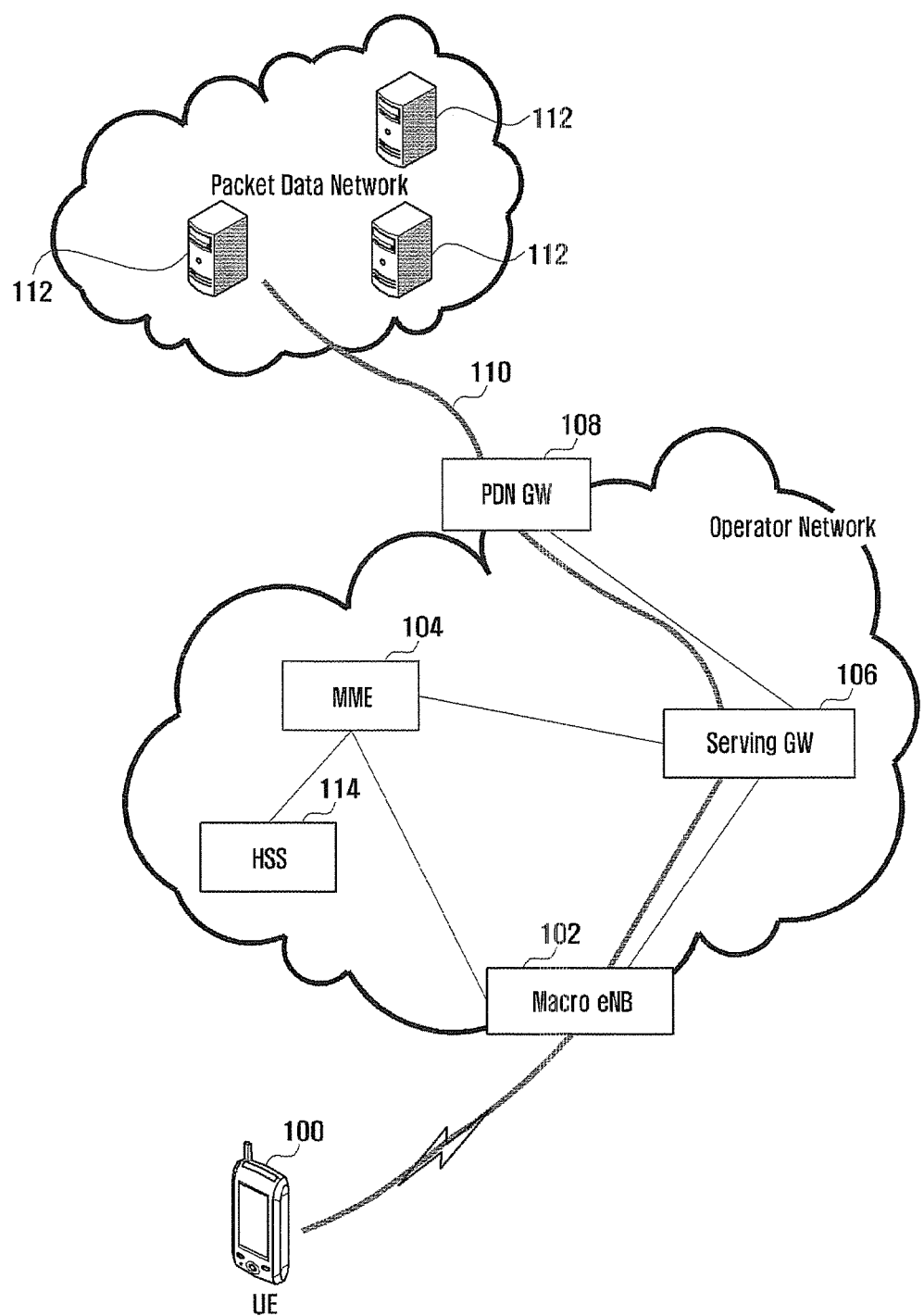
FIG. 1 is a diagram illustrating a legacy wireless communication system.
Figure 2:
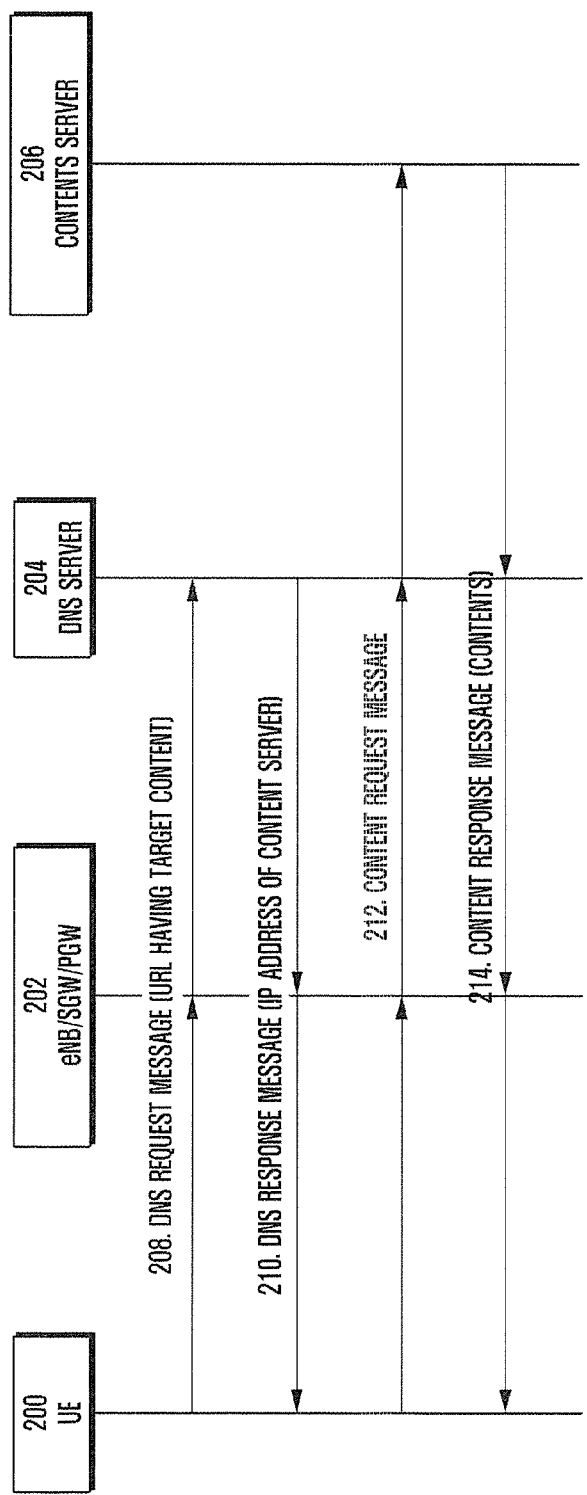
FIG. 2 is a signal flow diagram illustrating a procedure of acquiring contents in a conventional wireless communication system.
Figure 3:
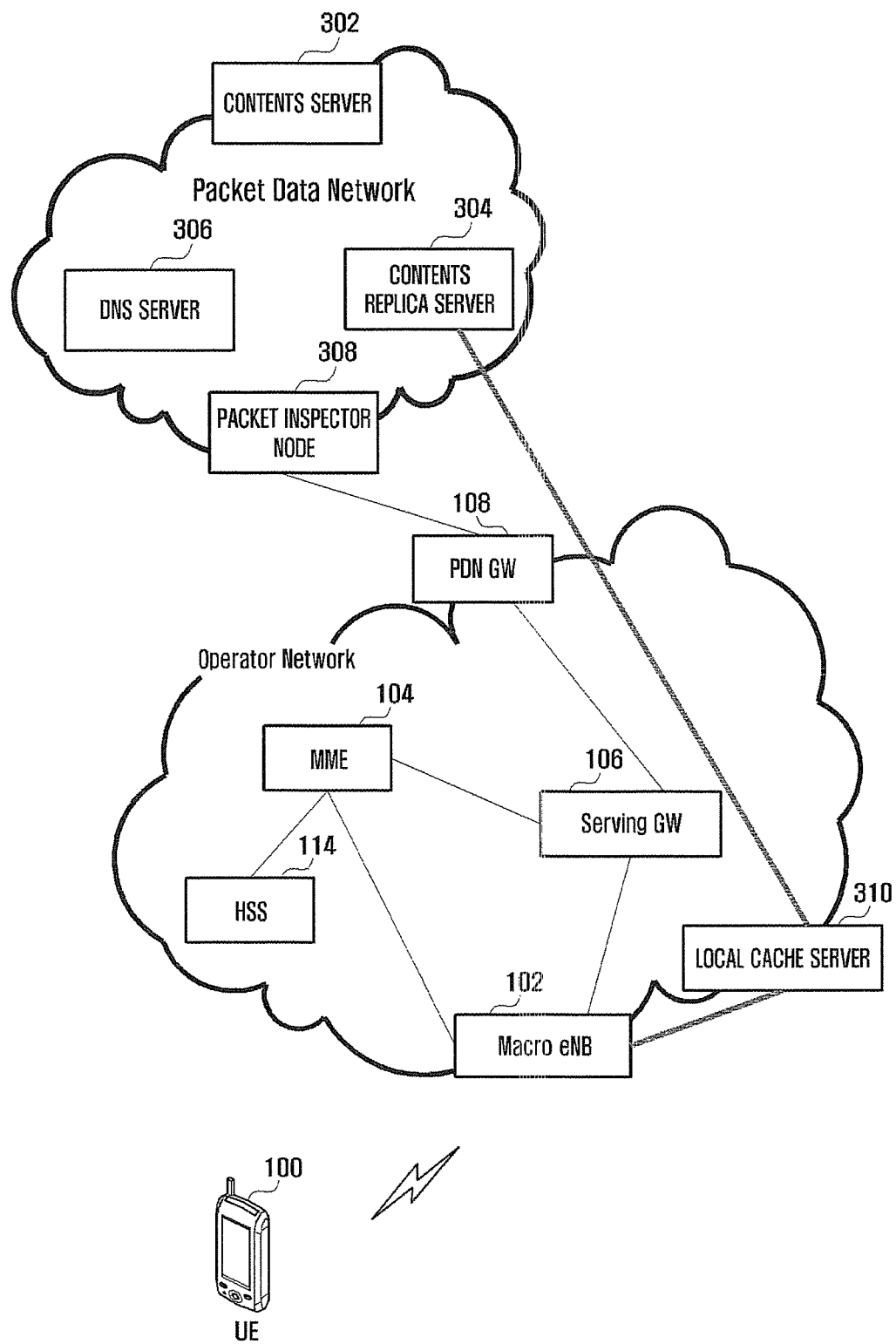
FIG. 3 is a diagram illustrating architecture of the mobile communication network according to an embodiment of the present disclosure.

FIG. 3 is a diagram illustrating architecture of the mobile communication network according to an embodiment of the present disclosure.

Referring to FIG. 3, in addition to the contents server 302 storing data contents, there is a contents replica server 304 storing replicas of the contests stored in the contents server 302 near the Packet Data Network Gateway (PGW) on the data network. The contents replica server 304 may determine a local cached server 310 close to the eNB 102 serving the UE 100 based on the location information of the UE for contents transmission. A packet inspector node 308 is positioned between PGW 108 and the data network to inspect the DNS packets transmitted between the PGW 108 and the DNS server 306.

If a DNS request message including URL for downloading contents is received from the terminal, the DNS server 306 sends the UE the IP address of the contents server 302 or the contents replica server 304. That is, the DNS server 306 checks the location information on the UE and sends the IP address of the contents server 302 or the contents replica server 304 near around the UE.

Finally, the local cache server 310 may be located near the eNB 102 included in the mobile communication operator network to relay data between the eNB 102 and the content replica server 304. Although, the description is directed to the case that the packet inspector node 308 is implemented in separation from the PGW 108, the present disclosure is not limited thereto. That is, the packet inspector node 308 may be integrated in the PGW 108.

Figure 4:
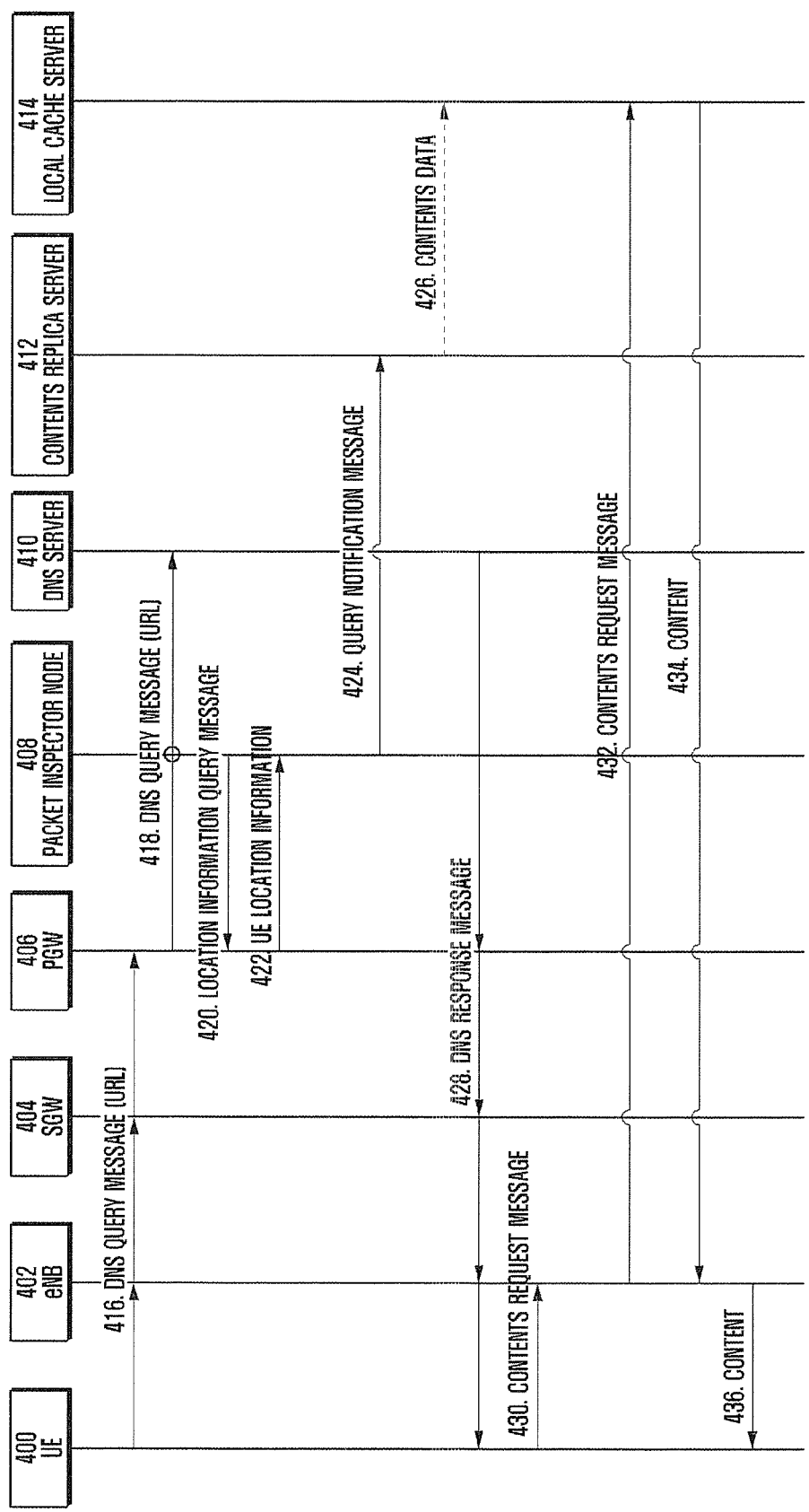
FIG. 4 is a diagram illustrating a procedure for the UE to receive contents from the local cache server according to the first embodiment of the present disclosure.

FIG. 4 is a diagram illustrating a procedure for the UE to receive contents from the local cache server according to the first embodiment of the present disclosure.

Referring to FIG. 4, the terminal 400 sends a DNS Query message including URL for receiving contents to the PGW 406 via the eNB 402 and the SGW 404 at operation 416. The PGW 406 forwards the DNS Query message including the URL to the DNS server 410 at operation 418. At this time, the packet inspector node 408 inspecting the message transmitted between the PGW 406 and DNS server 410 detects the DNS request message. The packet inspector node 408 inspects whether the contents replica server 412 is capable of serving the requested content to the UE 400.

If the contents replica server 412 indicated by the URL of the DNS request message is capable of serving the content, the packet inspector node 408 sends the PGW 406 a location information query message requesting for the location information of the UE which has transmitted the DNS query message at operation 420. For this purpose, the packet inspector node 408 may sends the PGW 406 the IP address of the UE 400 which has transmitted the DNS query message or the entire DNS query message.

The PGW 406 sends the packet inspector node 408 the UE location information at operation 422. The UE location information may include information on the serving eNB 402, TAI information at the location of the UE 400, and location information of other UEs. The packet inspector node 408 may send the contents replica server 412 a Query Notification message at operation 424, the Query Notification message including the UE location information transmitted by the PGW 406 and URL information acquired in response to the query from the UE at operation 418.

The content replica server 412 checks the local cache server 414 capable of serving the UE 400 based on the location information of the UE. The contents replica server 412 checks whether the local cache server 414 has no content associated with the URL requested by the UE. If the local cache server 414 has the content associated with the URL requested by the UE, the content replica server 412 transmits the content associated with the URL to the local cache server 414. The DNS server 410 which has received the DNS query message at operation 418 sends the UE 400 a DNS response message including the IP address of the contents replica server 412 at operation 428.

The UE 400 sends the eNB 402 a content request message at operation 430. At this time, the eNB 400 determines whether to transmit the content request message to the SGW 404 or the local cache server 414. The determination may be made based on whether the destination IP address of the content request message is the IP address of the contents server but not rule out other methods.

If it is determined to send the content request message to the local cache server 414, the eNB 402 sends the local cache server the content request message at operation 432. Then the local cache server 414 transmits the requested content to the eNB at operation 434, and the eNB 402 delivers the content to the UE 400 at operation 436.

Afterward, if another UE requests for the same content which has been stored in the local cache server 414, the procedure of FIG. 4 in which operation 426 is omitted is performed. This means that there is no need of transmitting the same content from the data network to the radio communication network. Since the content stored in the local cache server is provided, the mobile communication network may use the conserved resource for other useful service.

Figure 5:
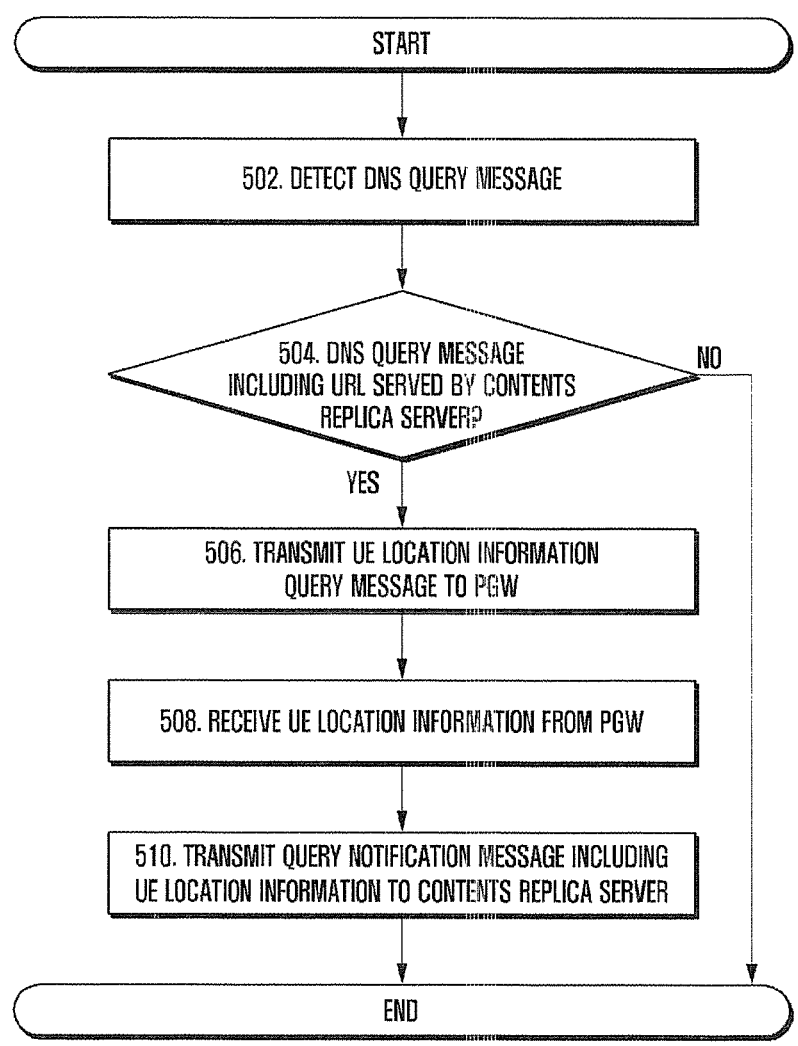
FIG. 5 is a flowchart illustrating the operation of the packet inspector node according to the first embodiment of the present disclosure.

FIG. 5 is a flowchart illustrating the operation of the packet inspector node according to the first embodiment of the present disclosure.

Referring to FIG. 5, the packet inspector node 408 detects a DNS query message among the messages transmitted from the PGW 406 to the DNS server 410 at operation 502. The packet inspector node 408 checks whether the DNS query message includes URL served by the content replica sever 412 at operation 504.

If the URL served by the content replica server 412 is included, the PGW 406 sends a UE location information query message at operation 508. If the UE location information is received from the PGW 408 at operation 508, the packet inspection node 408 sends the contents replica server 412 a query notification message including the UE location information and the URL information requested by the UE. If no URL server by the content replica server 412 is included at operation 504, the packet inspector node 408 ends the operation.

Figure 6:
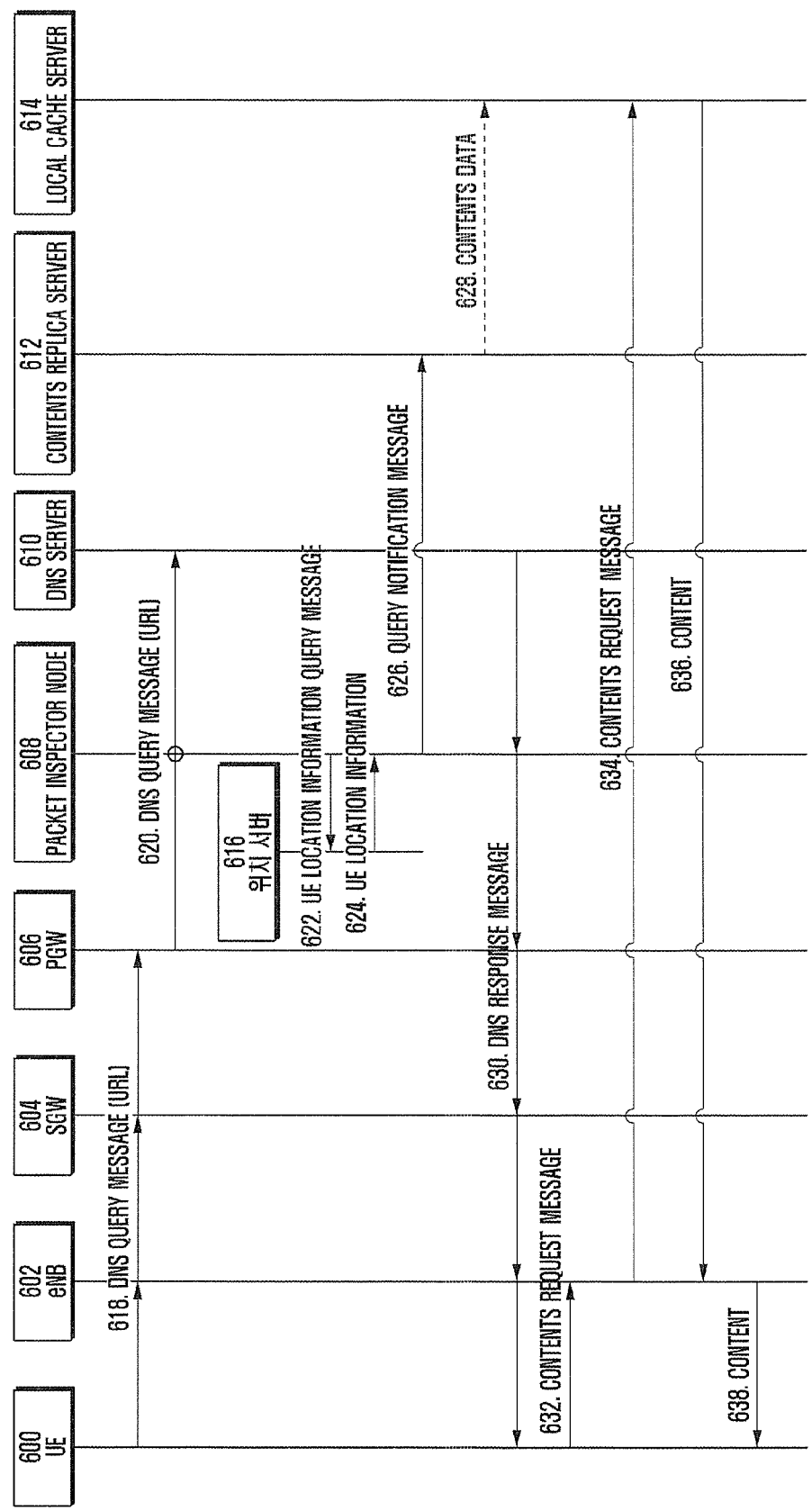
FIG. 6 is a diagram illustrating a procedure for the UE to receive contents from the local cache server according to the second embodiment of the present disclosure.

FIG. 6 is a diagram illustrating a procedure for the UE to receive contents from the local cache server according to the second embodiment of the present disclosure.

Referring to FIG. 6, the UE 600 sends the PGW 606 a DNS query message including URL for receiving contents therefrom via the eNB 602 and SGW 604 at operation 618. The PGW 606 forwards the DNS query message to the DNS server 610 at operation 620. At this time, the packet inspector node 608 which inspects the message between the PGW 606 and the DNS server 610 detects the DNS query message.

If it is possible for the contents replica server 612 to serve the content of the URL, the packet inspector node 608 sends the message querying the location information on the UE which has transmitted the DNS query message to the location server 616 storing the location informations on the individual UEs at operation 622. For this purpose, the packet inspector node 608 may transmit the IP address of the UE which has transmitted the DNS query message or the entire DNS query message.

The location server 616 sends the packet inspection node 608 the UE location information at operation 624. At this time, the UE location information may include the information on the eNB 602 to which the UE 600 has attached, TAI information on where the UE is located, and location information on other UEs. The packet inspection node 608 sends the contents replica server 612 the Query Notification message at operation 626, the Query Notification message including the UE location information acquired from the location server 616 and the URL information requested by the UE at operation 620

The content replica server 612 checks the local cache server 614 capable of serving the UE 600 based on the UE location information. The contents replica server 612 checks the local cache server 614 has the content of the URL requested by the UE. If the local cache server 614 does not have the content associated with the URL requested by the terminal, the contents replica server 612 sends the local cache server 614 the related content data at operation 628.

Upon receipt of the DNS query message, the DNS server 610 sends the UE 600 a DNS response message including the IP address of the contents replica server 612 at operation 630. Then the terminal 600 sends the eNB 602 a content request message including the IP address of the contents replica server 612 at operation 632. The eNB 602 determines whether to forward the content request message to the SGW 604 or the local cache server 614. For this purpose, the eNB 602 checks whether the Destination IP Address of the content request message is a contents server IP address.

If it is determined to forward the content request message to the local cache server 614, the eNB 602 forwards the content request message to the local cache server 614. Then the local cache server 614 transmits the requested content to the eNB 602 at operation 636. The eNB 602 delivers the content received from the local cache server 614 to the UE 600 at operation 638.

Afterward, if the same content is requested by other terminals, the content stored in the local cache server 614 is provided through the procedure of FIG. 6 without operation 628. This means that there is no need of transmitting the same content from the data network to the radio communication network but the content stored in the local cache server is provided such that the mobile communication network may use the conserved resource for other useful service.

Figure 7:
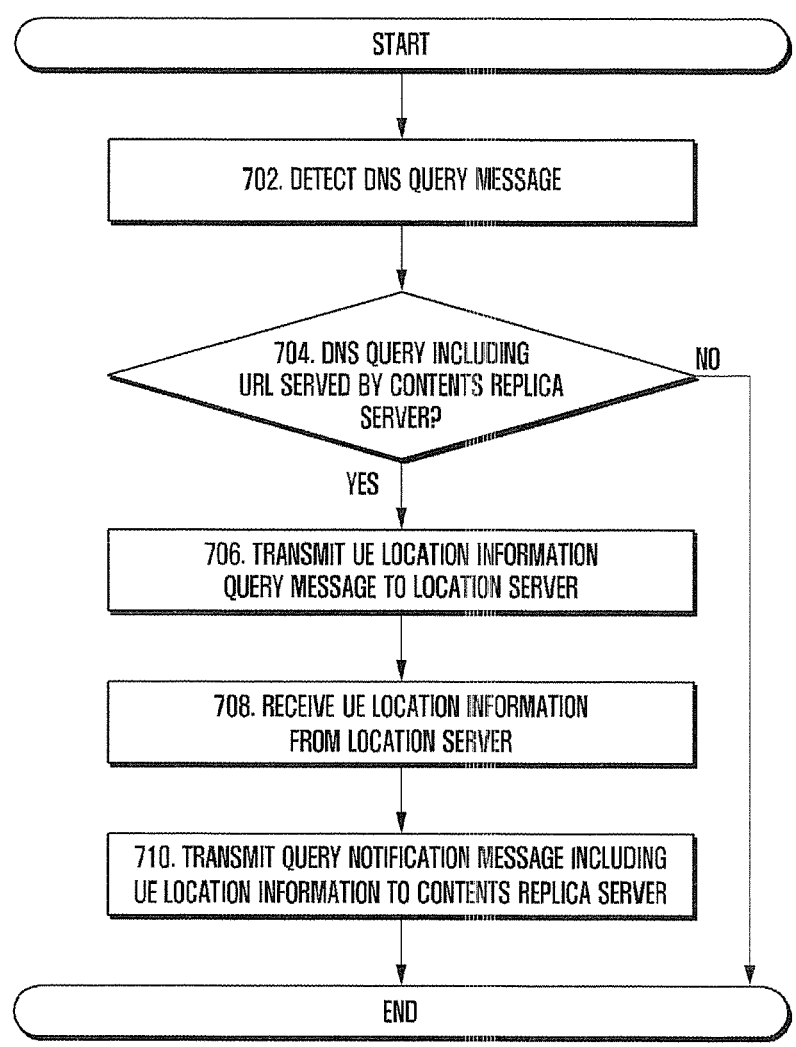
FIG. 7 is a flowchart illustrating the operation of the packet inspector node according to the second embodiment of the present disclosure.

FIG. 7 is a flowchart illustrating the operation of the packet inspector node according to the second embodiment of the present disclosure.

Referring to FIG. 7, the packet inspector node 608 detects the DNS query message among the messages transmitted from the PGW 606 to the DNS server 610 at operation 702. The packet inspector node 608 also checks whether the DNS query message includes the URL served by the contents replica server 612 at operation 704.

If the DNS query message includes the URL served by the contents replica server 612, the packet inspector node 608 sends a query message requesting for the location information on the UE transmitted the DNS query message at operation 706. If the UE location information is received from the location server at operation 708, the packet inspector node 608 sends a Query Notification message including the UE location information and the URL information requested by the UE to the contents replica server 612 at operation 710 and ends the procedure. Otherwise if the DNS query message includes the URL served by the contents replica server 612, the packet inspector node 608 ends the procedure immediately.

Figure 8:
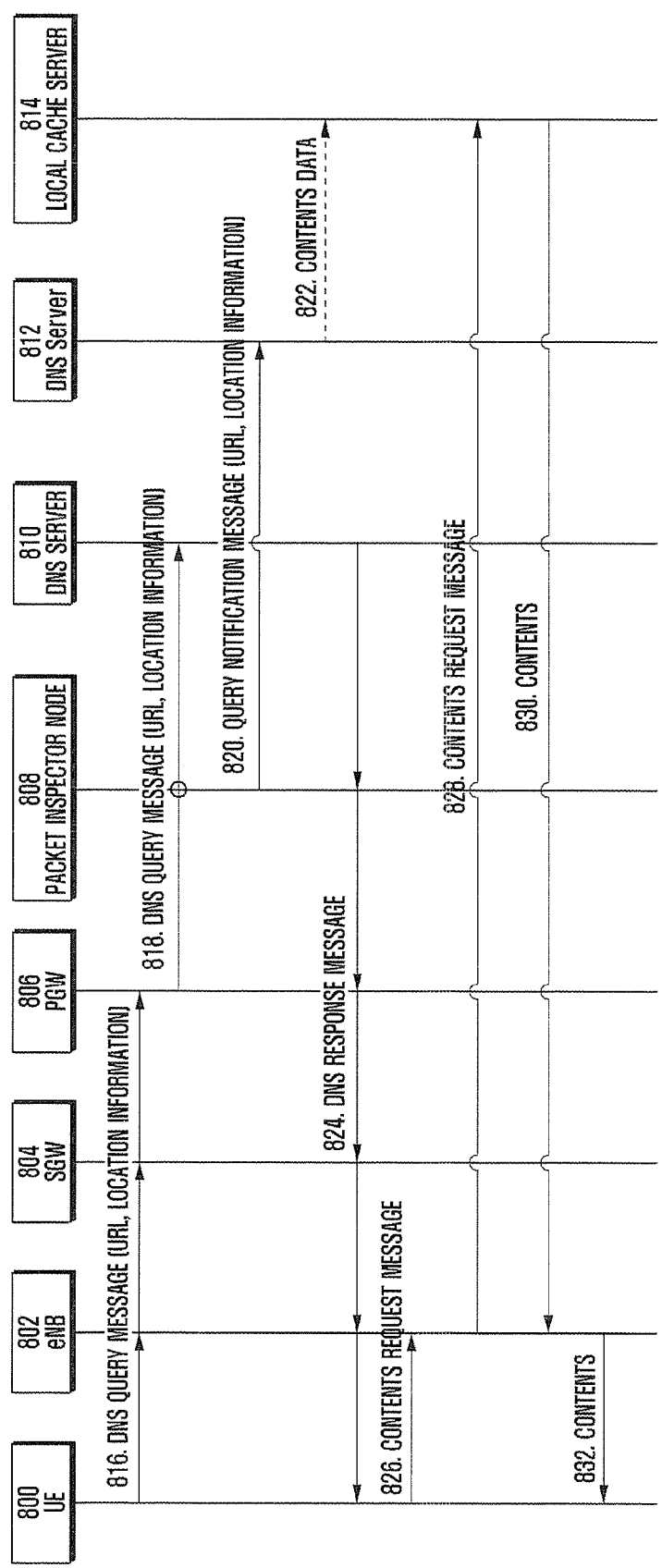
FIG. 8 is a diagram illustrating a procedure for the UE to receive contents from the local cache server according to the third embodiment of the present invention.

FIG. 8 is a diagram illustrating a procedure for the UE to receive contents from the local cache server according to the third embodiment of the present invention.

Revering to FIG. 8, the UE 800 sends the PGW 806 a DNS query message including its location information via the eNB 802 and the SGW 804 at operation 816. At this time, the UE location information may include the information on the eNB serving the UE 800, TAI information of the area where the UE 800 is located, and location information on other UEs. The PGW 806 forwards the DNS query message to the DNS server 810 at operation 818. At this time, the packet inspector node 808 inspecting the messages from the PGW 806 to the DNS server 810 inspects the DNS query message. The packet inspector node 808 checks the location information on the terminal 800 which is included in the DNS query message.

If the URL of the DNS query message can be served by the contents replica server 812, the packet inspector node 808 sends the Query Notification message including the UE location information and the URL information requested by the UE to the content replica server 812 at operation 820. The contents replica server 812 checks the local cache server 814 capable of serving the UE 800 based on the UE location information. The content replica server 812 checks whether the local cache server 814 has the content related to the URL requested by the UE.

If the local cache server 814 has no content related to the URL requested by the UE, the content replica server 812 transmits the related content data to the local cache server 814 at operation 822. If the DNS query message is received at operation 318, the DNS sends the UE 800 the DNS response message including the IP address of the content replica server 812 at operation 824.

The UE 800 sends the eNB 802 the content request message including the IP address of the content replica server 812 at operation 826. At this time, the eNB 802 determines whether to send the content request message to the SGW 804 or the local cache server 814. The eNB 802 determines whether the destination IP address of the content request message is a contents server IP address.

If it is determined to send the content request message to the local cache server 814, the eNB 802 sends the local cache server 814 the content request message. Then the local cache server 814 transmits the requested content to the eNB 802 at operation 830. The eNB 802 delivers the content received from the local cache server 814 to the UE 800 at operation 832.

Afterward, if the same content is requested by another UE, the corresponding content stored in the local cache server 814 is provided through the procedure of FIG. 8 in which operation 822 is omitted. Since the content stored in the cache server can be served without extra transmission of the same content from the data network to the radio communication network, the radio communication network may use the conserved resource for other useful services.

Figure 9:
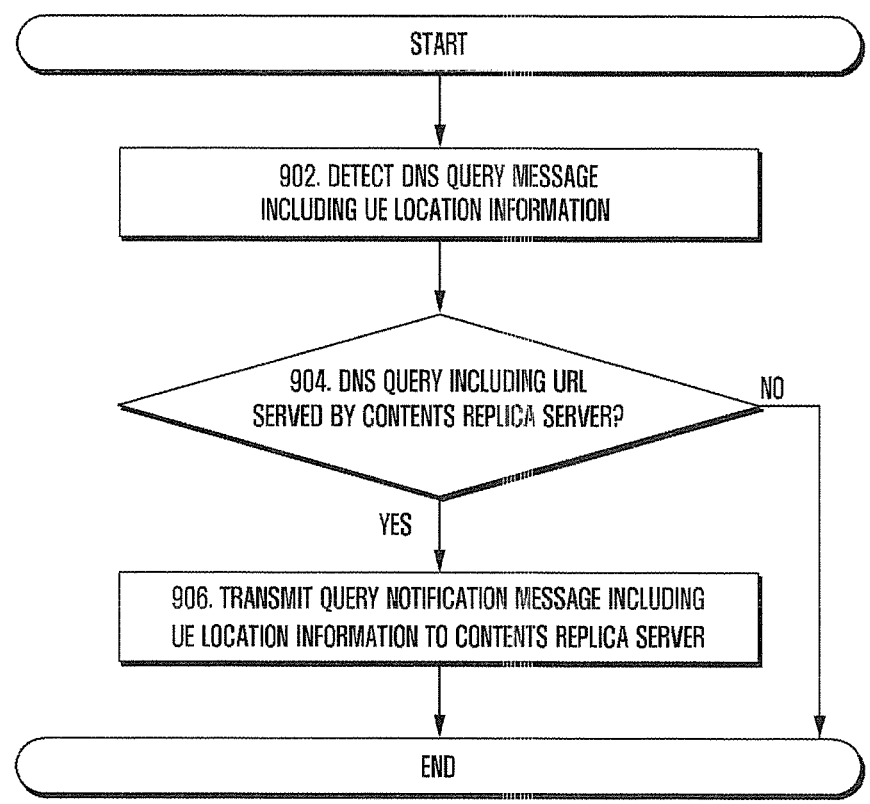
FIG. 9 is a flowchart illustrating the operation of the packet inspector node according to the third embodiment of the present disclosure.

FIG. 9 is a flowchart illustrating the operation of the packet inspector node according to the third embodiment of the present disclosure.

Referring to FIG. 9, the packet inspector node 808 detects the DNS query message including UE location information among the message transmitting from the PGW 606 to the DNS server 610 at operation 902. The packet inspector node 808 determines whether the DNS query message includes the URL served by the content replica server 812 at operation 904.

If the DNS query message includes the URL served by the contents replica server 812, the packet inspector node 808 sends the contents replica server 812 a Query Notification message including the UE location information and the URL information requested by the UE at operation 906. However, if the DNS query message includes no URL served by the content replica server 812 at operation 904, the packet inspector node 808 ends the procedure immediately.

The first to third embodiments are directed to the case a connection has been established already between the eNB and the local cache server 310. The above embodiments include the operation of inspecting, at the eNB 102, all messages transmitted to the UE 100 to pick out the content request message to be transmitted to the local cache server 310. In order to negate such operations of the eNB 102, it may be considered to establish a dedicated bearer for content transmission between the UE 100 and the eNB 102 and a corresponding bearer between the eNB and the local cache server 310.

Figure 10:
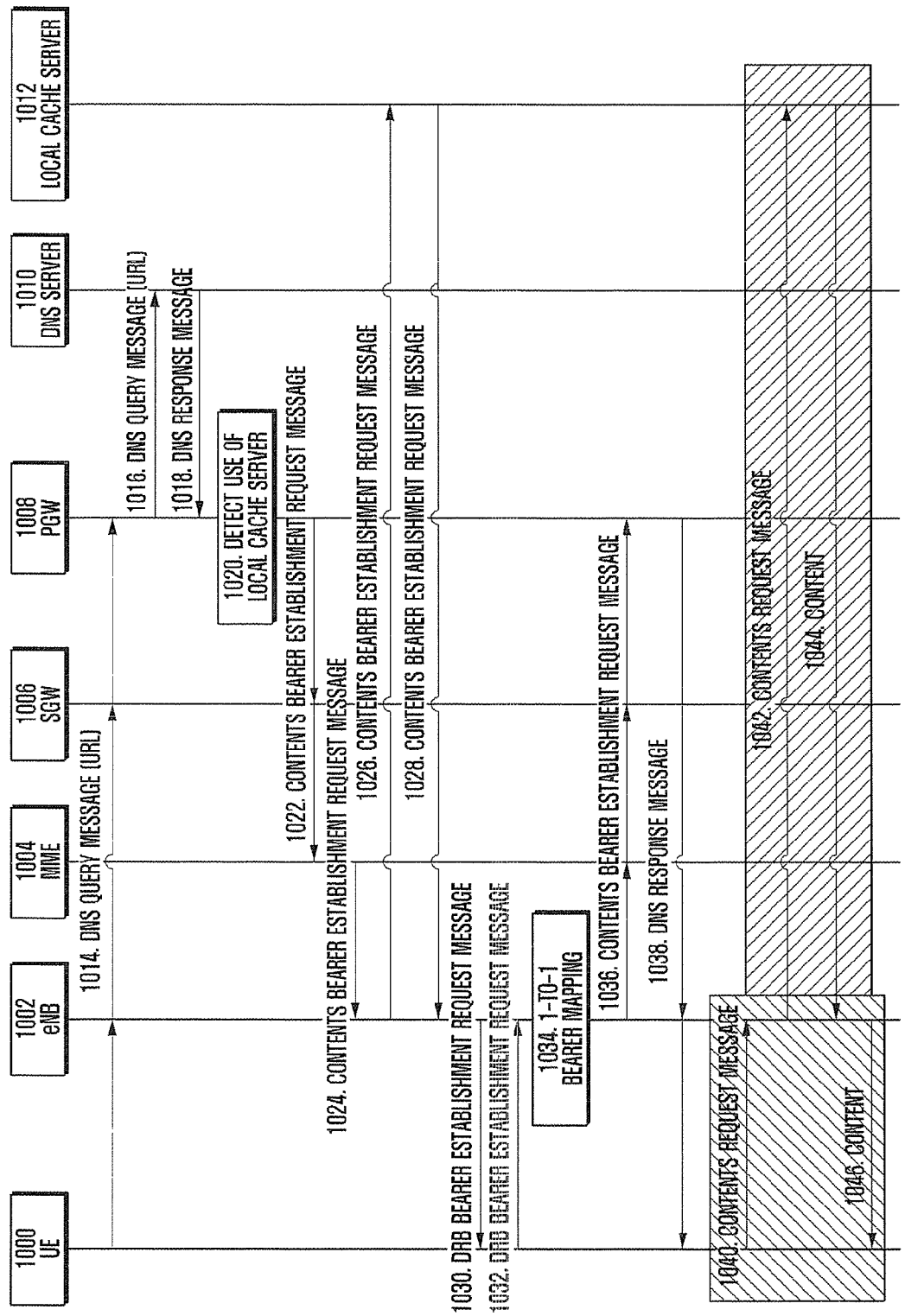
FIG. 10 is a illustrating a method of establishing a bearer for transmitting contents between UE and eNB and between eNB and local cache server according to the fourth embodiment of the present invention.

FIG. 10 is a illustrating a method of establishing a bearer for transmitting contents between UE and eNB and between eNB and local cache server according to the fourth embodiment of the present invention. For explanation simplicity and clarity, only the bearer establishment and configuration method is depicted in the drawing.

Referring to FIG. 10, the UE 1000 sends the PGW 1008 the DNS query message including the URL to request for contents via the eNB 1002 and SGW 1006 at operation 1014. The PGW 1008 forwards the DNS query message to the DNS server 1010 at operation 1016 and receives a DNS response message including the IP address of the content replica server (not shown) at operation 1018. The PGW 1008 may determine to establish a content bearer (DRB bearer) which makes it possible for the UE 1000 to communicate with the local cache server 1012 based on the URL information included in the DNS query message or the IP address of a specific content replica server (not shown) which is included in the DNS response message at operation 1020.

If it is necessary to establish the contents bearer, the PGW 1008 sends the Mobility Management Entity 1004 a contents bearer establishment request message at operation 1022. The Mobility Management Entity 1004 forwards the contents bearer establishment request message to the eNB 1002. Then the eNB 1002 establishes a first contents bearer with the local cache server 1012 through operations 1026 and 1023.

The eNB 1002 establishes a second contents bearer with the UE 1000 through operations 1030 and 1032. The eNB 1002 establishes the second contents bearer between the UE 1000 and the eNB 1002 at operation 1034 and the first contents bearer between the eNB 1002 and the local cache server 1012. Next, the eNB 1002 sends the Mobility Management Entity 1004 a contents bearer establishment response message at operation 1036. The Mobility Management Entity 1004 forwards the contents bearer establishment response message received from the eNB 1002 to the PGW 1008.

The PGW 1008 forwards the DNS response message received at operation 1018 to the UE 1000 at operation 1038. Afterward, the UE 1000 sends the content request message, at operation 1040, on the second contents bearer established at operations 1030 and 1032. Then the eNB 1002 sends the content request message to the local cache server 1012 through the first contents bearer corresponding to the second contents bearer at operation 1042. The local cache server 1012 sends, at operation 1044, the eNB 1002 the content data requested by the UE 1000 through the first contents bearer established at operations 1026 and 1028. Then the eNB 1002 sends the contents data to the UE 1000 through the second contents bearer corresponding to the first contents bearer established with the local cache server 1012 at operation 1046.

Figure 11:
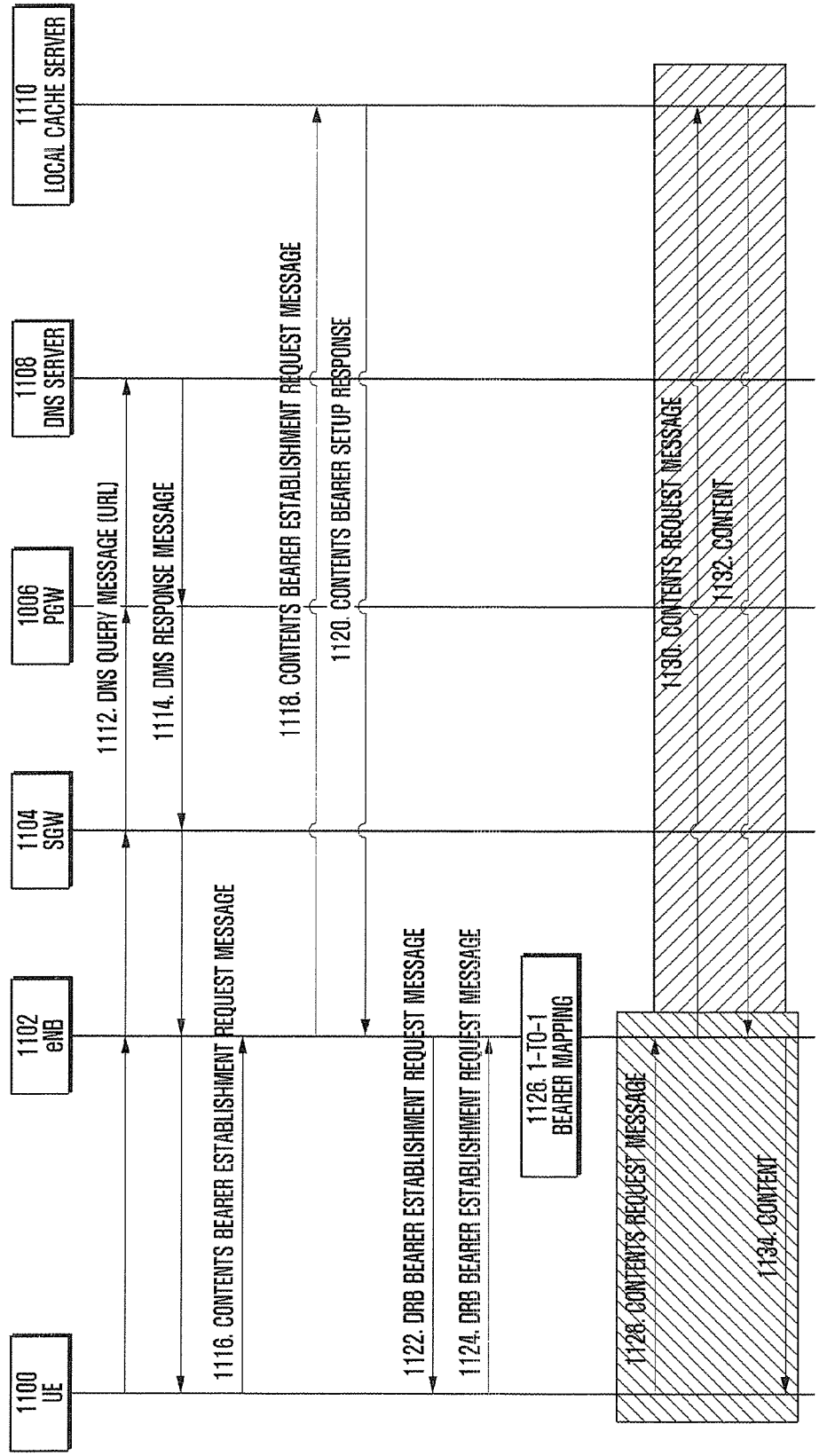
FIG. 11 is a diagram illustrating a method of establishing a bearer for transmitting contents between UE and eNB and between eNB and local cache server according to the fifth embodiment of the present invention.

FIG. 11 is a diagram illustrating a method of establishing a bearer for transmitting contents between UE and eNB and between eNB and local cache server according to the fifth embodiment of the present invention. For explanation simplicity and clarity, only the bearer establishment and configuration method is depicted in the drawing.

Referring to FIG. 11, the terminal 1100 sends the DNS query message to the DNS server 1108 through eNB 1002, SGW 1104, and PGW 1106 at operation 1112. The UE 1100 receives the DNS response message from the DNS server 1108 at operation 1114. At this time, the UE 1100 may determine to establish a contents bearer for communication with the cache server 1012 based on the URL information included in the DNS query message and the IP address of the contents replica server (not shown) which is included in the DNS response message.

If it is necessary to establish the contents bearer, the UE 1100 sends the eNB 1102 a contents bearer establishment request message at operation 1116. Then the eNB 1102 establishes a first content bearer with the local cache server 1110 through operations 1118 and 1120. Afterward, the eNB 1102 establishes the second contents bearer with the UE 1000 through operations 1122 and 1124.

The eNB 1102 configures such that the second contents bearer between the UE 1100 and the eNB 1102 and the first contents bearer between the eNB 1102 and the local cache server 1110 correspond to each other at operation 1126. Afterward, if the UE 1100 transmits the content request message, at operation 1128, on the contents bearer established at operations 1122 and 1124, the eNB 1102 sends the local cache server 1110 the first content request message through the bearer corresponding to the second contents bearer established between the UE 1100 and the eNB 1102 at operation 1130.

The local cache server 1110 transmits, at operation 1132, the contents data requested by the UE 1100 to the eNB 1102 through the first contents bearer established at operations 1118 and 1120. The eNB 1102 transmits the contents data to the UE 1100 on the second contents bearer corresponding to the first contents bearer established between the local cache server 1110 and the eNB 1102 at operation 1134.

Figure 12:
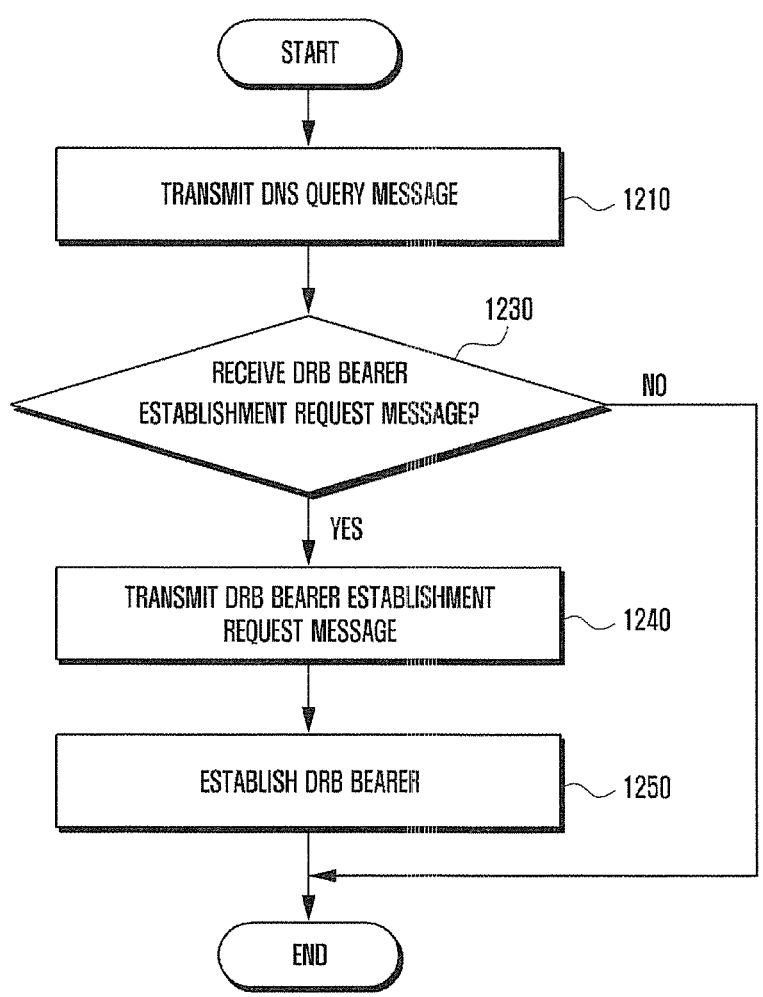
FIG. 12 is a flowchart illustrating a method for a UE to establish a bearer according to an embodiment of the present disclosure.

FIG. 12 is a flowchart illustrating a method for a UE to establish a bearer according to an embodiment of the present disclosure.

Referring to FIG. 12, the UE sends the DNS server the DNS query message including the URL of the requested content via the eNB, the SGW, and the PGW at operation 1210. The UE determines whether a message requesting for establishment of a contents bearer from the eNB at operation 1230. Although no shown in the drawing, the UE may determines whether to establish a contents bearer for communication with the local cache server based on the IP address of a specific content replica server has been established. If it is determined to establish a content bearer, the UE may send the eNB a message requesting for establishing a contents bearer.

If the contents bearer establishment request message is received from the eNB, the UE sends the eNB a contents bearer establishment response message at operation 1240. The UE establishes a contents bearer with the eNB. Then the eNB establishes the contents bearer with a local cache server and matches the contents bearer between the UE and the eNB to the contents bearer between the eNB and the local cache server. If the content request message transmitted by the UE is received through the contents bearer, the eNB receives the corresponding content through the contents bearer established with the local cache server and delivers the content to the UE.

Through the above procedure, the contents requested by the user are stored in the local cache server in advance and transmitted to plural terminals in the wireless communication system. Accordingly, it is possible to use the resources necessary for transmitting the same contents flexibly. In order to achieve this, the packet inspector node detects the content request message transmitted between the PGW and the DNS server and checks the location information on the UE transmitted the content request message to identify an adjacent local cache server. The UE may receive the intended contents from the checked local cache server. If the contents bearer for transmitting contents between the UE and the eNB and the contents bearer for transmitting the contents between the eNB and the local cache server are established, contents bearers are mapped. The UE may receive the contents from the local cache server through the established contents bearers.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method of transmitting contents by a content server in a wireless communication system, the method comprising:
   receiving a query notification message including uniform resource locator (URL) information and location information of a terminal, if a domain name system (DNS) request message is transmitted from the terminal;
   identifying a local cache server for transmitting a content, corresponding to the URL information, based on the location information of the terminal included in the query notification message; and
   transmitting the content corresponding to the URL information to the identified local cache server,
   wherein a content requested by the terminal is transmitted from the local cache server to the terminal via a base station, if a content request message is transmitted from the terminal to the local cache server via the base station, and wherein the content request message is transmitted, if a response message, including information on an address of the content server, is received according to the query notification message.

2. The method of claim 1, wherein the transmitting further comprises:
   transmitting the content to the identified local cache server, if the identified local cache server does not store the content.

3. The method of claim 1, wherein the identifying further comprises identifying the local cache server that is nearest to the terminal.

4. A content server for transmitting contents in a wireless communication system, the content server comprising:
   a transceiver configured to receive a query notification message, if a domain name system (DNS) request message is transmitted from a terminal,
   wherein the query notification message includes URL information and location information of a terminal; and
   a controller configured to identify a local cache server to transmit a content, corresponding to the URL information, based on the location information of the terminal included in the query notification message and control the transceiver to transmit the content to the identified local cache server,
   wherein a content requested by the terminal is transmitted from the local cache server to the terminal via a base station, if a content request message is transmitted from the terminal to the local cache server via the base station, and wherein the content request message is transmitted, if a response message, including information on an address of the content server, is received according to the query notification message.

5. The content server of claim 4, wherein the controller is configured to identify the local cache server that is nearest to the terminal.

6. A method of inspecting a packet, the method comprising:
   identifying location information of a terminal, if a domain name system (DNS) request message is transmitted from the terminal; and
   transmitting a query notification message including uniform resource locator (URL) information and location information of the terminal to a content server,
   wherein a content corresponding to the URL information is transmitted from the content server to a local cache server, and the content corresponding to the URL information is transmitted from the local cache server to the terminal via a base station, if a content request message is transmitted from the terminal to the local cache server via the base station, and
   wherein the content request message is transmitted, if a response message, including information on an address of the content server, is received according to the query notification message.

7. The method of claim 6, wherein the identifying further comprises:
   requesting a packet data network gateway (PGW) for the location information of the terminal.

8. The method of claim 6, wherein the identifying further comprises:
   transmitting a request message to a location server storing location information on individual terminals for requesting the location information of the terminal; and
   receiving the location information of the terminal from the location server.

9. The method of claim 6, wherein the identifying further comprises:
   identifying the location information included in the DNS request message.

10. The method of claim 6, further comprising:
    identifying the content server to transmit a query notification message based on the URL information.

11. An apparatus for inspecting packet, the apparatus comprising:
    a controller configured to identify location information of a terminal, if a domain name system (DNS) request message is received; and
    a transceiver configured to transmit a query notification message including URL information and location information of the terminal to a content server, wherein a content corresponding to the URL information is transmitted from the content server to a local cache server, and the content corresponding to the URL information is transmitted from the local cache server to the terminal via a base station, if a content request message is transmitted from the terminal to the local cache server via the base station, and
    wherein the content request message is transmitted, if a response message, including information on an address of the content server, is received according to the query notification message.

12. The apparatus of claim 11, wherein the controller for requesting to a packet data network gateway (PGW) for the location information of the terminal.

13. The apparatus of claim 11, wherein the controller is configured to control the transceiver to transmit the request message to a location server storing location information on individual terminals for requesting the location information of the terminal and receive the location information of the terminal from the location server.

14. The apparatus of claim 11, wherein the controller is configured to identify the location information included in the DNS request message.

15. The apparatus of claim 11, wherein the controller is configured to identify the content server to transmit a query notification message based on URL information.

16. A method of transmitting contents by a base station in a wireless communication system, the method comprising:
    transmitting a domain name system (DNS) request message to a gateway, if the DNS request message is transmitted from a terminal;
    transmitting, if a content request message is transmitted from the terminal, the content request message to a local cache server;
    receiving a content requested by the terminal from the local cache server; and
    transmitting the content to the terminal, wherein the content is transmitted from a content server to the local cache server, if a query notification message including uniform resource locator (URL) information and location information of the terminal is transmitted to the content server and the local cache server is identified based on the location information of the terminal, and
    wherein the content request message is transmitted, if a response message, including information on an address of the content server, is received according to the query notification message.

17. A base station for transmitting contents in a wireless communication system, the base station comprising:
    a transceiver configured to transmit and receive a signal; and
    a controller configured to:
        control the transceiver to transmit, if a content request message is transmitted from a terminal, a domain name system (DNS) request message to a gateway;
        transmit a content request message to a local cache server, if the content request message is transmitted from the terminal;
        receive a content requested by the terminal from the local cache server; and
        transmit the content to the terminal, wherein the content is transmitted from a content server to the local cache server, if a query notification message including uniform resource locator (URL) information and location information of the terminal is transmitted to the content server and the local cache server is identified based on the location information of the terminal, and
    wherein the content request message is transmitted, if a response message, including information on an address of the content server, is received according to the query notification message.

* * * * *